United States Patent

[15] 3,646,597

Feemster

[45] Feb. 29, 1972

[54] VARIABLE THRUST PROPULSION ENGINE

[72] Inventor: John R. Feemster, Saratoga, Calif.

[73] Assignee: United Technology Center, Sunnyvale, Calif.

[22] Filed: Apr. 4, 1969

[21] Appl. No.: 814,893

[52] U.S. Cl. .................................................60/251
[51] Int. Cl. ...............................................F02k 9/06
[58] Field of Search .............................60/254, 251

[56] References Cited

UNITED STATES PATENTS 2,755,620  7/1956  Gillot........................................60/256
3,283,510  11/1966  Mangum et al............................60/251
3,340,691  9/1967  Mangum....................................60/211

Primary Examiner—Samuel Feinberg
Attorney—Edgar J. Brower, H. H. Losche and Paul S. Collignon

[57] ABSTRACT

A variable thrust propulsion engine having a plurality of nozzles, a fuel section containing an outer core of a first solid propellant and an inner core of another solid propellant, said inner core of another solid propellant having a plurality of cavities therein, and means for supplying liquid oxidizer into said plurality of cavities.

2 Claims, 3 Drawing Figures

INVENTOR
JOHN R. FEEMSTER

VARIABLE THRUST PROPULSION ENGINE

BACKGROUND OF THE INVENTION

The present invention relates to a propulsion engine and more particularly to a propulsion engine having variable thrust.

Rocket propulsion systems are being used extensively as assist-takeoff devices for large aircraft, boosters for missiles, and propulsion engines for vehicles and projectiles. There are various types of engines and each has its particular advantages and disadvantages.

One type of engine, known as a hybrid type, is described in U.S. Pat. No. 3,203,174, which issued Aug. 31, 1965, to George S. Sutherland. In this engine, a porous fuel grain is used which is composed essentially of boron, beryllium, and aluminum and the oxidizer is fluid, such as oxygen, hydrogen peroxide, nitrogen dioxide, nitric acid or mixtures thereof.

A second type of rocket propulsion system utilizes a liquid fuel and a solid oxidizer. One such device using liquid fuel and a solid oxidizer is disclosed in U.S. Pat. No. 3,136,119, which issued June 9, 1964, to William H. Avery. In this patented device, a combustion chamber contains a hollow cylindrical grain of solid oxidizing material and fuel from a tank is injected into the cavity of the solid oxidizing material.

SUMMARY OF THE INVENTION

The present invention relates to a propulsion engine that can provide a variable thrust and particularly one that can provide a large initial thrust for accelerating a vehicle to an optimum cruise speed, and thereafter provide a reduced thrust to sustain the vehicle at its cruising speed. A fuel section is provided which has an outer core of a first solid propellant and an inner core of a second solid propellant. The inner core of solid propellant is provided with a plurality of cavities, equal in number to the number of nozzles of the engine, and means are provided for injecting liquid oxidizer into these cavities during operation of the engine.

Figure 3:
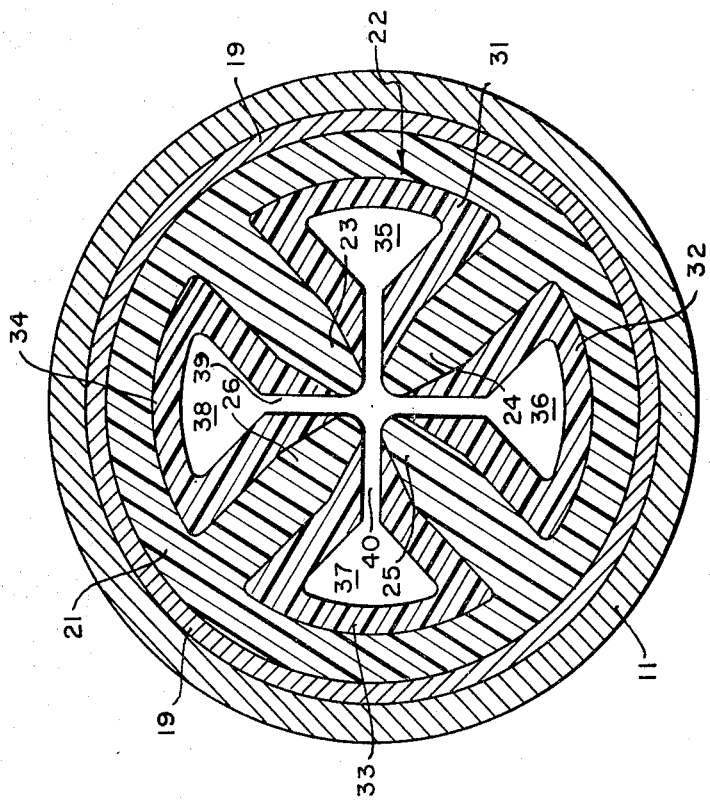
FIG. 3 is a sectional view taken on line 3—3 of FIG. 2.
Figure 1:
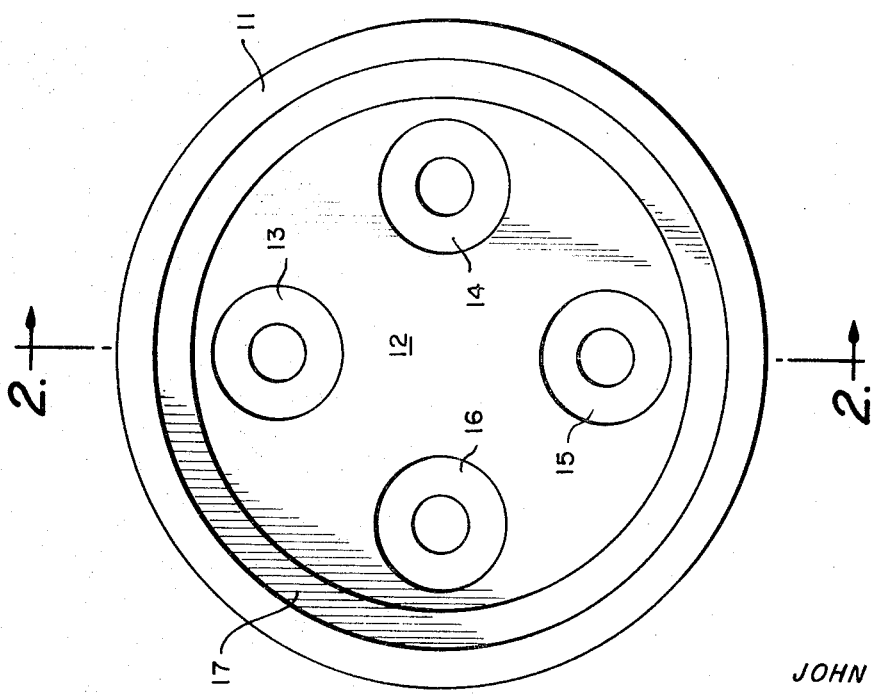
FIG. 1 is an end view of a preferred embodiment of the present invention.

Referring now to the drawing, there is shown an engine casing 11 and a nozzle plate 12 having a plurality of nozzles therein, there being four nozzles 13, 14, 15, and 16, for purposes of illustration. A retainer ring 17 is provided to lock nozzle plate 12 within casing 11, and a plurality of pins 18 secure ring 17 to casing 11.

Figure 2:
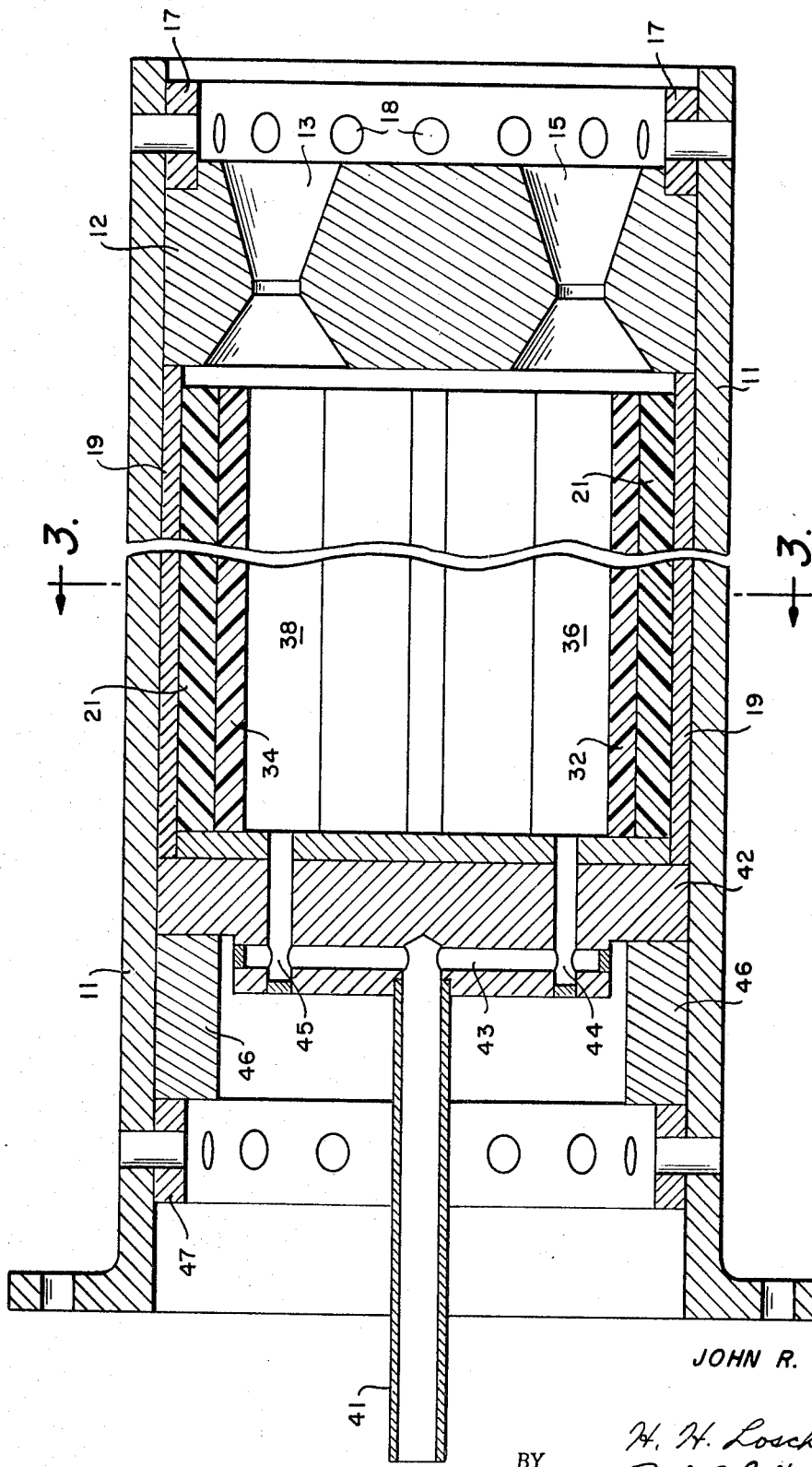
FIG. 2 is a sectional view taken on line 2—2 of FIG. 1.

As best shown in FIGS. 2 and 3 of the drawing, a fuel section is provided adjacent nozzle plate 12 and consists of a case 19 in which an outer charge of solid propellant 21 and an inner charge of solid propellant 22 are provided. Four fingers 23, 24, 25, and 26 of solid propellant 21 extend radially inward to divide the inner charge of propellant 22 into four segments 31, 32, 33, and 34. Each segment has a cavity, these being numbered 35, 36, 37, and 38, respectively, and these cavities are connected by cross-channels 39 and 40. Each of the segments of the innner charge of propellant 22 are disposed opposite one of the nozzles in nozzle plate 12 so that, upon ignition of the inner charge of propellant 22, the products of combustion are directed out an adjacent nozzle.

By way of example, the outer charge of propellant 21 might be cast, and be comprised, by weight, of about 20 percent aluminum, about 25 percent ammonium perchlorate, about 20 percent of tetraformaltrisazine, and about 35 percent of a binder. The inner charge of propellant 22 might also be cast, and be comprised, by weight, of about 69.4 percent of ammonium perchlorate, about 17.0 percent of aluminum, about 0.1 percent of iron oxide, and about 13.5 percent of binder.

The engine of the present invention is designed to use a liquid oxidizer which is fed from an outside tank into casing 11 by means of pipe 41. A distribution plate 42 is attached to the inner end of pipe 41 and a passageway is provided to carry liquid oxidizer to the solid propellant. As shown in FIG. 2 of the drawing, a cross-passageway 43 is connected to pipe 41 and passageway 44, which connects with cross-passageway 43, directs liquid oxidizer into cavity 36 of segment 32 and, likewise, passageway 45 connects with cross-passageway 43 and directs liquid oxidizer into cavity 38 of segment 34. Two additional passageways, not shown, are provided to direct liquid oxidizer into cavities 35 and 37. By way of example, the liquid oxidizer might be chlorine trifluoride, nitrogen dioxide, or some similar oxidizer. A spacer 46 and second retainer ring 47 are provided to lock distribution plate 42 in casing 11.

OPERATION

If desired, initial ignition of solid propellants 21 and 22 can be made with a suitable pyrotechnic device and, upon ignition, liquid oxidizer is injected into cavities 35, 36, 37, and 38. As best shown in FIG. 3 of the drawing, the inner charge of propellant 22 will be consumed first and is designed to provide a high initial thrust in order to accelerate a vehicle to an optimum cruise speed. Throttling can be obtained by metering the quantity of liquid oxidizer which is injected into the combustion chamber. When liquid flow is stopped, combustion will terminate. After most, or all, of propellant 22 is consumed, propellant 21 will be consumed. Propellant 21 is designed to provide less thrust than propellant 22, as a reduced thrust will sustain a vehicle at a desired speed once that desired speed is reached. Although a pyrotechnic ignition may be desirable at the start, during later start and stop sequences, hypergolic ignition may be used.

It can thus be seen that the present invention provides a relatively simple device for providing variable thrust in a rocket engine. For example, a peak thrust of about 6,000 pounds may be provided, and then this thrust may be reduced to about 400 pounds, thereby providing a throttling ratio of about 15 to 1. Of course, the desired mission of the engine will determine the required design parameters for the engine.

I claim:

1. A variable thrust propulsion engine comprising,
   an engine casing,
   a plurality of exhaust nozzles in one end of said casing,
   a fuel section adjacent said plurality of exhaust nozzles having an outer core of first solid propellant and an inner core of second solid propellant, said outer core of first solid propellant having a plurality of inwardly extending fingers separating said inner core of second solid propellant into a plurality of segments equal in number to the number of exhaust nozzles, and
   means for injecting a liquid oxidizer into said fuel section whereby combustion of said inner core of solid propellant precedes combustion of said outer core of solid propellant.

2. A variable thrust propulsion engine as set forth in claim 1 wherein each said segment of said inner core of said second solid propellant has a cavity therein and wherein said liquid oxidizer is injected into each said cavity.

* * * * *